United States Patent [19]

Igrow

[11] Patent Number: 5,129,461
[45] Date of Patent: Jul. 14, 1992

[54] PLASTIC SHOE FOR HORSES

[76] Inventor: Sergej Igrow, Fritz-Flinte-Ring 87, D-2000 Hamburg 60, Fed. Rep. of Germany

[21] Appl. No.: 676,196

[22] Filed: Mar. 27, 1991

[30] Foreign Application Priority Data

Sep. 27, 1988 [DE] Fed. Rep. of Germany ....... 3832705

[51] Int. Cl.$^5$ .................. A01L 3/00; A01L 5/00
[52] U.S. Cl. .......................... 168/4; 168/28; 168/DIG. 1
[58] Field of Search .............. 168/4, 17, 18, 24, 26, 168/28, DIG. 1; 54/82

[56] References Cited

U.S. PATENT DOCUMENTS

| | | | |
|---|---|---|---|
| 2,041,538 | 5/1936 | Gash et al. | 168/18 |
| 3,236,310 | 2/1966 | Quick | 168/18 |
| 4,346,762 | 8/1982 | Tovim | 168/4 |
| 4,892,150 | 1/1990 | Thoman | 168/DIG. 1 X |

FOREIGN PATENT DOCUMENTS 3721856 6/1988 Fed. Rep. of Germany .......... 168/4

*Primary Examiner*—Robert P. Swiatek
*Attorney, Agent, or Firm*—Herbert L. Lerner; Laurence A. Greenberg

[57] ABSTRACT

A plastic shoe for horses to be secured to a hoof in conjunction with exposure to a thermal operation includes a sole part having an upper edge and being constructed substantially in the shape of a horseshoe for placement under an edge of a hoof. A wall part is secured to the sole and protrudes from the upper edge for laminar joining to a conical outer surface of the hoof. At least one of the parts is constructed of material being shrinkable under the effect of heat.

14 Claims, 4 Drawing Sheets

PLASTIC SHOE FOR HORSES

The invention relates to a plastic shoe for horses, which is exposed to a thermal operation in conjunction with it being secured to a hoof, including a sole constructed substantially in the shape of a horseshoe for disposition under an edge of the hoof, and a wall secured to the sole and protruding from an upper edge thereof for laminar joining to a conical outer surface of the hoof.

Such shoes are known in the prior art. In those constructions, the hoof stands on the sole of the plastic shoe that is laminarly secured by the wall of the shoe to the outer surface of the hoof. As a rule it is secured by adhesive bonding.

An advantage of that kind of structure is the avoidance of nailing, which is damaging to the hoof and to the elasticity of the construction, which permits the inherent motions of the hoof that are physiologically necessary.

A disadvantage of the known constructions is the difficult problem of inexpensive mass production of plastic shoes for hooves, which by nature have greatly different shapes, especially in terms of the circumferential shape of the sole. That problem could only be partially solved heretofore. It is known to manufacture plastic shoes, that are individually tailor-made in the factor. However, that is extremely complicated.

Constructions are also known in which the shoes are made in standard sizes and fitted on site to the individual hoof. For instance, for such a purpose it is known to construct the shoe in two parts and to join them on site after cutting the soles to size. That is likewise very labor-intensive and requires skill.

Another disadvantage of the prior art is the joining of the wall part to the outer surface of the hoof. In the prior art, elastic straps are adhesively bonded, which requires holding and pressing them against the hoof at least for the bonding time of the adhesive. Once again that causes problems in attachment.

U.S. Pat. No. 3,921,721 discloses gluing the sole and the wall of a shoe to the hoof under the influence of heat, by using a thermoplastic adhesive. For that purpose, hot wires are integrated into the shoe, making the shoe expensive.

It is accordingly an object of the invention to provide a plastic shoe for horses, which overcomes the hereinaforementioned disadvantages of the heretofore-known devices of this general type and which creates an economical shoe that is simpler to attach.

With the foregoing and other objects in view there is provided, in accordance with the invention, a plastic shoe for horses to be secured to a hoof in conjunction with exposure to a thermal operation, comprising a sole part having an upper edge and being constructed substantially in the shape of a horseshoe for placement under an edge of a hoof, and a wall part secured to the sole and protruding from the upper edge for laminar joining to a conical outer surface of the hoof, at least one of the parts being constructed of material being shrinkable under the effect of heat.

Shrinkable plastics are known from other fields of art (such as shrink-on hoses and sleeves, etc), and from the standpoint of solidity and in particular resistance to abrasion, are suitable for the purposes in question herein. Using such materials in this field affords considerable advantages. If the wall is made of shrinkable plastic, then it can be shrunk directly onto the hoof by the influence of heat and it presses so firmly on it and engages uneven areas of the surface of the hoof in such a way that under some circumstances it is even possible to dispense with adhesive bonding. The shrinking-on process proceeds very quickly. Immediately thereafter, final solidity is attainable by cooling down, so that even with nervous horses which do not stand still for long, better results are attainable than with the known adhesive bonding of straps. The sole can be made of different materials, which are formed individually onto the hoof in a known manner. If the sole is constructed in such a way as to be shrinkable, then it can be manufactured in such a way as to be oversized and shrunk to correct size onto the outline of the hoof. It can also be shrink-widened from an undersize. Both parts can be constructed in such a way as to be shrinkable. Then, the sole for instance, can first be shrunk to correct size, individually fitted to the necessary dimension, and then the wall may be shrunk onto the hoof surface. The tools necessary (torch or hot-air pistol) are easy to obtain and operate. A shrinkable sole of this kind can also be used without a shrinkable wall, by being secured to the hoof through the use of typical adhesive straps, for instance. The overall result is a construction that produces very exact fitting of the shoe to the hoof, which is important for wear resistance and assures easy detachability at a low production cost.

In accordance with another feature of the invention, the wall part is shrinkable and has an inner surface being coated with hot-melt adhesive which softens at a shrinkage temperature. The hot-melt adhesive is heated in the shrinking process, so that exact pressure adaptation and adhesive bonding result in a single operation.

In accordance with a further feature of the invention, the sole part has a peripheral location with protrusions formed thereon, and the wall part is shrinkable and is shrunk or shrink-fitted onto the peripheral location. In particular, shrinking onto the sole can be performed in a preliminary stage of the attachment process, for instance in the factory. This renders special fastening means for fastening the wall to the sole unnecessary.

In accordance with an added feature of the invention, both of the parts are integrally shrinkable. In this case, the entire construction can be cost-effectively made from one material. After the pretreatment in the factory which is necessary for the shrinkage process, the shoe is individually fitted on the hoof by shrinking the sole to the necessary circumferential shape and by shrinking the wall onto the outer surface of the hoof.

In accordance with an additional feature of the invention, the sole part is shrinkable and has back ends and a shrinkable crossbar in the vicinity of the back ends. The crossbar is known for increasing the strength of the sole, in particular between the back ends. In a shrinkable embodiment, it can simplify exact shape adjustment of the sole.

In accordance with yet another feature of the invention, the sole part is shrinkable and has a shrinkable cover wall covering the sole part. A cover wall which spans the surface of the sole in this way can also be necessary for other reasons, for example for hoof hygiene or to repel dirt, and can advantageously also be used for shrinking.

In accordance with yet a further feature of the invention, the sole part has shrinkable and non-shrinkable pieces disposed in alternation in circumferential direction. In this construction, the sole only needs to be partly heated, at the shrinkable pieces. The horse can already be standing on the sole, and the non-shrinkable parts of the sole which are not to be heated assure adequate strength.

In accordance with a concomitant feature of the invention, the shrinkable pieces are narrower than the non-shrinkable pieces. The shrinkable pieces in this case have a small cross section and can more quickly be thoroughly heated and thus made to shrink.

Other features which are considered as characteristic for the invention are set forth in the appended claims.

Although the invention is illustrated and described herein as embodied in a plastic shoe for horses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
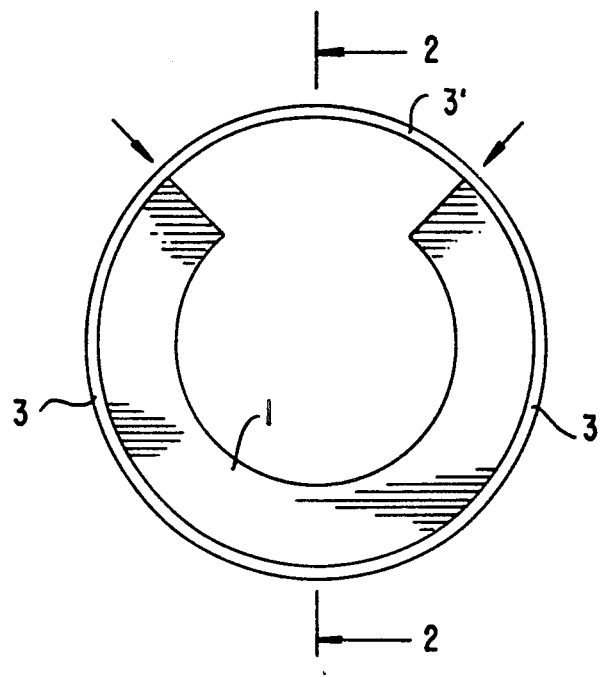
FIG. 1 is a diagrammatic plan view of a plastic shoe with a shrinkable wall.
Figure 2:
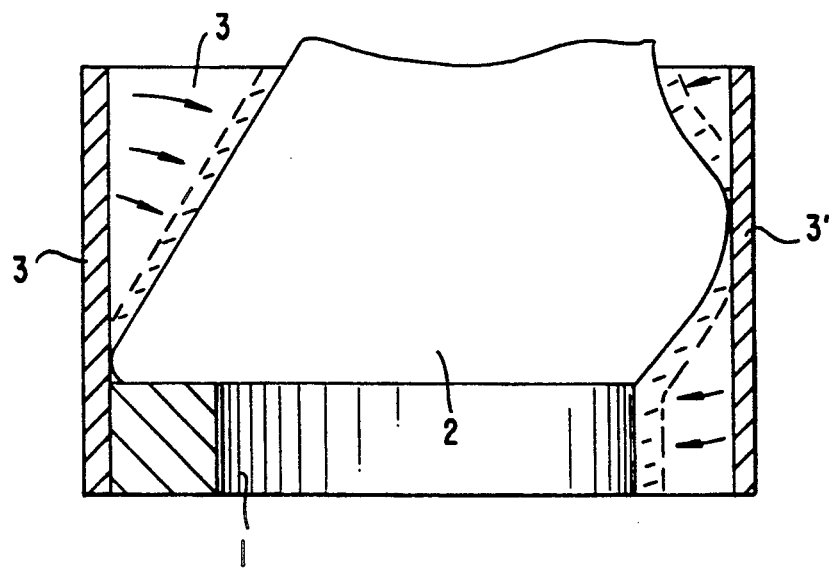
FIG. 2 is a longitudinal-sectional view taken along the line 2—2 in FIG. 1 in the direction of the arrows, with a hoof.

Referring now to the figures of the drawing in detail and first, particularly, to FIGS. 1 and 2 thereof, there is seen a first embodiment of a plastic shoe according to the invention, having a sole 1 which is constructed in the form of a horseshoe, being shown in a plan view in FIG. 1 and in a sectional view in FIG. 2. This periphery of the sole is to be fitted exactly to the circumferential shape of a hoof, in other words to a lower edge of an outer surface 2 of the hoof, as shown in FIG. 2. A wall 3, which initially extends cylindrically upward, is secured to the outside or outer surface of the sole 1.

The wall 3 is formed of shrinkable material, or in other words it is constructed as a shrunk-on hose, in such a manner that it contracts in circumference upon being heated. Once the hoof is in a standing position and fitted on the sole, as FIG. 2 shows, the wall 3 can be heated, for example by waving a torch back and forth from the outside or by blowing on it with a hot-air blower. The wall 3 then contracts, as indicated by arrows in FIG. 2, and presses against the hoof on all sides, in particular onto its outer surface 2, in the position shown in broken lines in FIG. 2. A rear portion 3' of the wall 3 is subsequently no longer needed and can be trimmed off along the arrows shown in FIG. 1. However, this rear portion 3' is advantageously still present when the wall is shrunk on, and it assures a centered application, with sufficiently high pressure.

Figure 2A:
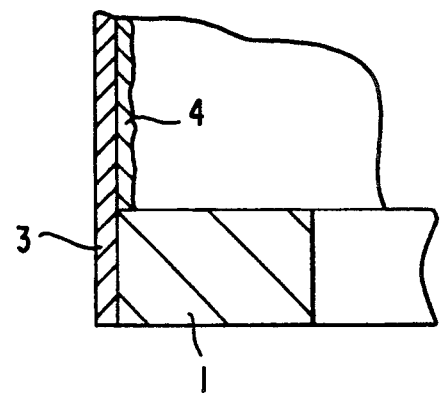
FIGS. 2a-2c are fragmentary sectional views of portions of FIG. 2 showing various constructions.

The wall 3 is pressed so firmly onto the hoof upon shrinking and meshes with the uneven areas of the hoof, that adequate adhesion may already be provided in this way, under some circumstances. However, a film 4 of a hot melt adhesive may advantageously be provided on the inner surface or inside of the wall 3, as FIG. 2a. When the wall is shrunk on, the film 4 is melted by the heat supplied in the shrinking process, and it produces a firm adhesive bond with the outer shrinkage surface 2 under the pressing force of the shrinkage. The adhesive coating 4 can be omitted in the rear portion 3' of the wall.

Figure 2B:
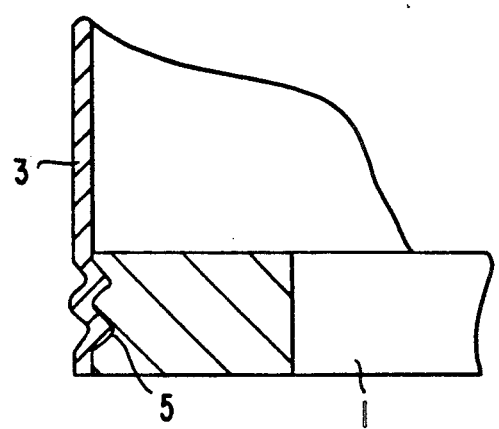

Fastening of the wall 3 to the sole 2 can be performed in various ways, for example by gluing, screw fastening, or by covering with an adhesive. As FIG. 2b shows, the wall 3 can also be shrunken or shrink-fitted onto the sole 1, in which case the peripheral surface of the sole 1 advantageously has the grooves 5 as shown, or other protrusions into which the wall 3 can shrink, so that they mesh.

Figure 2C:
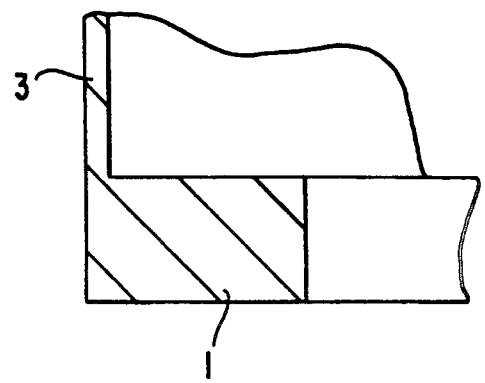

As FIG. 2c shows, the wall 3 and the sole 1 may also be integrally constructed. Both parts may be shrinkable, or as described above only the wall 3 may be shrinkable, while the sole 1, although being of the same material, is not shrinkable because it has been pretreated in a suitable way. In this embodiment particularly a simple manufacture results.

It is particularly advantageous for both parts to be constructed in such a way as to be shrinkable. For example, the embodiment of FIGS. 1 and 2 may have a shrinkable sole 1. In this way, not only is the attachment of the shoe to the hoof made simpler by means of shrinkage of the wall 3, but individual fitting of the sole to the circumferential shape of the hoof is simplified as well, namely by expansion or shrinkage contraction of the sole from a mass-produced standard shape made undersized or oversized.

Figure 3:
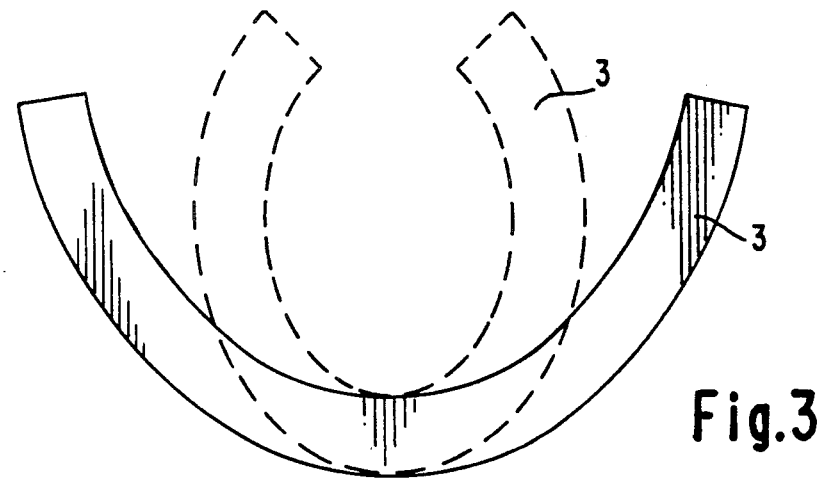
FIG. 3 is a plan view similar to FIG. 1 of a shrinkable sole.

If the sole is oversized, then, as in FIG. 3, which shows only the sole, it can be brought to the exact hoof shape, which is shown in broken lines, by shrinkage from the oversize, which is represented by solid lines. For instance, as FIG. 2 shows, this can be done by placing the sole on the horse in the front region (at the left in FIG. 2) and then heating the sole all around its periphery, so that it contracts everywhere far enough so that the wall 3 rests against the sole. Advantageously, the wall 3 is not yet heated in this process and it is only later, once the sole fits, that it is shrunk on, as described above.

A shrinkable sole can also be secured to the hoof in some other way than by means of the above-described shrinkable wall 3, for example by using the adhesive-bondable straps typical of the prior art, which may then be formed of some other suitable plastic material.

Figures 4A, 4B:
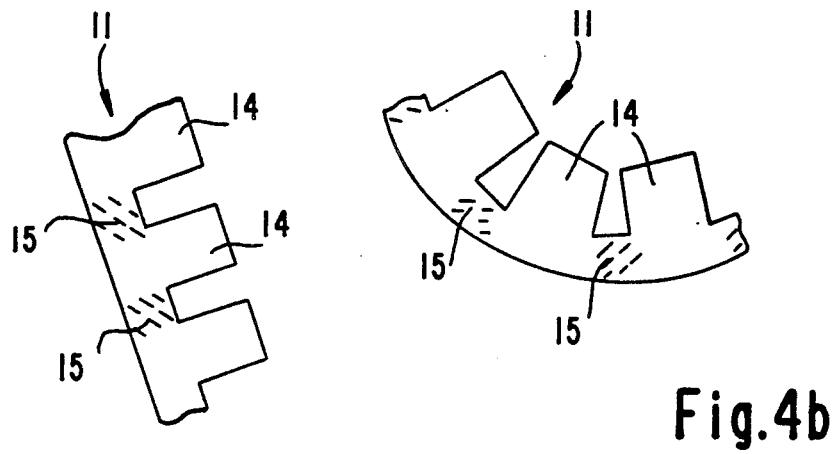
FIGS. 4a and 4b are fragmentary plan views of a portion of a variation of FIG. 3, shown in respective shrunken and unshrunken states.

In FIG. 4a, a shrinkable sole 11 is shown that has wide pieces 14 and narrow pieces 15, or in other words it has approximately the appearance of a comb, as seen in a plan view. The sole 11 is manufactured in such a manner that the narrow parts 15 are shrinkable but the wide parts 14 are not. If this sole is then heated, it shrinks to the shape shown in FIG. 4b, and accordingly can adapt to the hoof shape by reducing its circumference, in accordance with FIG. 3. It is also possible to manufacture with an undersized circumference, in which the circumference is enlarged by shrinkage and adapted to the hoof shape in this way.

As advantageous feature in the embodiment of FIGS. 4a and 4b is the low mass of the shrinkable pieces 15, which can be heated quickly, while the more massive pieces 14 remain cold and thus dimensionally stable. The horse can already be standing on this sole while the sole is being shrunk-on exactly.

According to a simplified embodiment, a sole the same width as that shown in FIG. 3 can also have shrinkable and unshrinkable pieces and can accordingly be shrunk incrementally. The advantages are substantially the same as in the embodiment of FIGS. 4a and 4b.

Figure 5A:
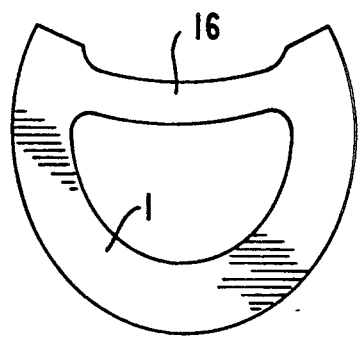
FIGS. 5a and 5b are plan views similar to FIG. 3 of a sole with a crossbar, in respective unshrunken and shrunken conditions.
Figure 5B:
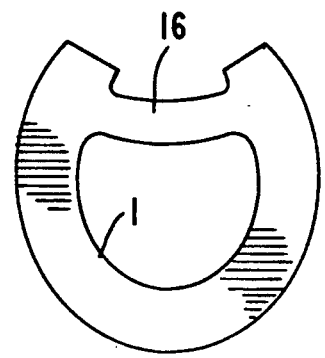

FIG. 5a shows a sole that substantially corresponds to FIG. 3 but has a crossbar 16 near the back ends, which is known from the prior art and is readily used, for example for the sake of better dimensional stability of the sole. If the crossbar 16 is also made of shrinkable material, then it shrinks as shown in FIG. 5b, and in this way it can be useful for exact adjustment to the width of the back of the hoof.

Figure 6A:
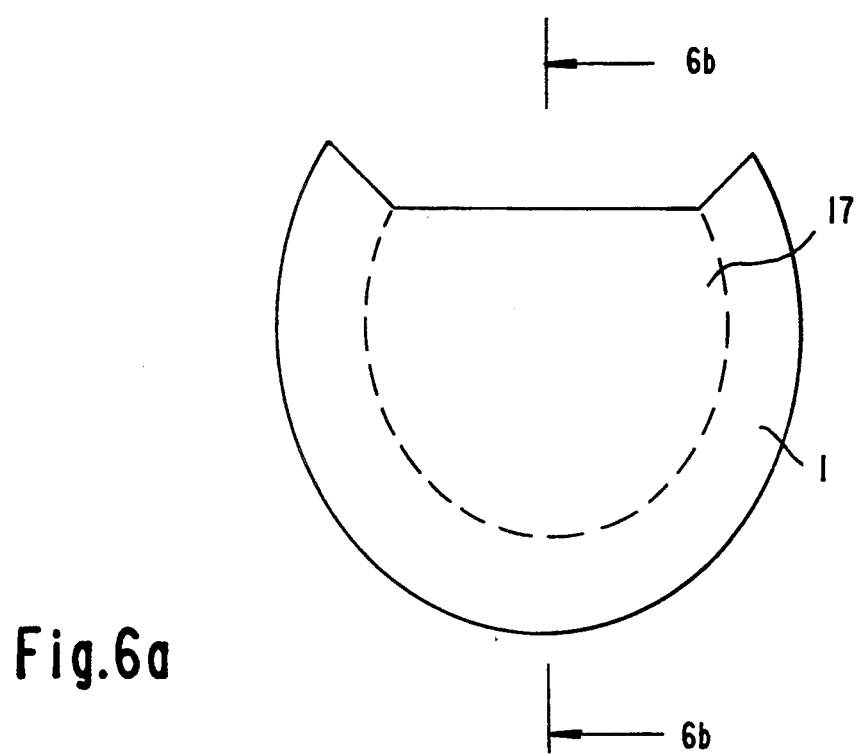
FIG. 6a is a plan view of a shrinkable sole with a cover wall.
Figure 6B:
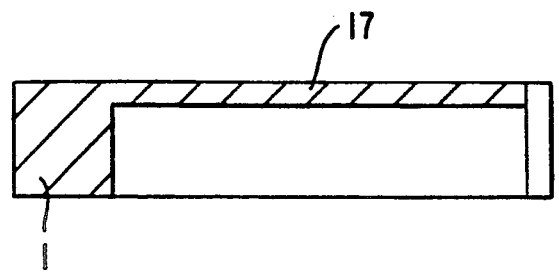
FIG. 6b is a longitudinal-sectional view taken along the line 6b—6b of FIG. 6a, in the direction of the arrows.

A further variant is shown in FIGS. 6a and 6b. In that embodiment, the sole is constructed in such a way as to be closed in its upper region, with a cover wall 17 that is likewise formed of shrinkable material. By heating the cover wall 17, for example partially, the shrinkage of the sole 1 can be controlled accurately to the exact circumferential shape. The cover wall, which has a known construction, can also be advantageous for other purposes, such as to protect the underside of the hoof from intruding dirt or the like.

I claim:

1. A plastic shoe for horses to be secured to a hoof in conjunction with exposure to a thermal operation, comprising a sole part having an upper edge and being constructed substantially in the shape of a horseshoe for placement under an edge of a hoof, and a wall part secured to said sole part and protruding from said upper edge for laminar joining to a conical outer surface of the hoof, at least one of said parts being at least partly constructed of material being shrinkable under the effect of heat, said sole part having shrinkable and non-shrinkable pieces disposed in alternation in circumferential direction.

2. The plastic shoe according to claim 1, wherein said wall part is shrinkable and has an inner surface being coated with hot-melt adhesive which softens at a shrinkage temperature.

3. The plastic shoe according to claim 1, wherein said sole part has a peripheral location with protrusions formed thereon, and said wall part is shrinkable and is shrunk onto said peripheral location.

4. The plastic shoe according to claim 1, wherein both of said parts are integrally shrinkable.

5. The plastic shoe according to claim 1, wherein said sole part has back ends and a shrinkable crossbar in the vicinity of said back ends.

6. The plastic shoe according to claim 1, wherein said sole part has a shrinkable cover wall covering said sole part.

7. The plastic shoe according to claim 1, wherein said shrinkable pieces are narrower than said non-shrinkable pieces.

8. A plastic shoe for horses, comprising shrinkable plastic to be shrunk from a given standard form to a shape corresponding to a hoof, a sole part having an upper edge and being constructed substantially in the shape of a horseshoe for placement under an edge of a hoof, and a wall part secured to said sole part and protruding from said upper edge for laminar joining to a conical outer surface of the hoof, said sole part having shrinkable and non-shrinkable pieces disposed in alternation in circumferential direction.

9. The plastic shoe according to claim 8, wherein said shrinkable pieces are narrower than said non-shrinkable pieces.

10. The plastic shoe according to claim 8, wherein said horseshoe-shaped sole part has back ends and a shrinkable crossbar in the vicinity of said back ends.

11. The plastic shoe according to claim 8, wherein said sole part has a peripheral location with protrusions formed thereon, and said wall part is shrinkable and is shrunk onto said peripheral location.

12. The plastic shoe according to claim 8, wherein said wall part is shrinkable and has an inner surface being coated with hot-melt adhesive which softens at a shrinkage temperature.

13. The plastic shoe according to claim 8, wherein said sole part has a shrinkable cover wall covering said sole part.

14. The plastic shoe according to claim 8, wherein both of said parts are integrally shrinkable.

* * * * *